United States Patent
Häring

[19]

[11] Patent Number: 6,024,479
[45] Date of Patent: Feb. 15, 2000

[54] SCREW EXTRUDER MECHANISM, IN PARTICULAR TWIN-SCREW EXTRUDER MECHANISM, FOR THE PROCESSING OF STRONGLY OUTGASSING MATERIALS

[75] Inventor: Erwin Häring, Stuttgart-Botnung, Germany

[73] Assignee: Krupp Werner & Pfleiderer GmbH, Germany

[21] Appl. No.: 09/022,505

[22] Filed: Feb. 12, 1998

[30] Foreign Application Priority Data

Feb. 28, 1997 [DE] Germany ............................ 197 08 097

[51] Int. Cl.⁷ ................................. B29B 7/48; B29B 7/84
[52] U.S. Cl. ................................. 366/75; 366/85; 425/203
[58] Field of Search ........................ 366/75, 76.3, 76.4, 366/76.6, 76.93, 79, 83–85; 425/203, 204, 208, 209

[56] References Cited

U.S. PATENT DOCUMENTS

| | | | |
|---|---|---|---|
| 3,535,737 | 10/1970 | Hendry ..................... | 425/203 |
| 3,563,514 | 2/1971 | Shattuck .................... | 366/75 |
| 3,917,507 | 11/1975 | Skidmore ................... | 366/75 |
| 3,963,558 | 6/1976 | Skidmore ................... | 425/203 |
| 3,985,348 | 10/1976 | Skidmore ................... | 366/75 |
| 4,117,548 | 9/1978 | Craig ....................... | 366/83 |
| 4,212,543 | 7/1980 | Bersano .................... | 366/85 |
| 4,776,784 | 10/1988 | Batiuk ...................... | 366/75 |
| 4,824,448 | 4/1989 | Moriyama ................... | 425/203 |
| 4,877,390 | 10/1989 | Ocker et al. ................ | 425/208 |
| 4,902,455 | 2/1990 | Wobble ..................... | 366/75 |
| 5,080,845 | 1/1992 | Hermann et al. . | |
| 5,283,021 | 2/1994 | Shih ........................ | 425/204 |
| 5,338,112 | 8/1994 | Boden et al. ............... | 366/75 |
| 5,804,111 | 9/1998 | Kobayashi et al. ........... | 425/203 |

FOREIGN PATENT DOCUMENTS

| | | | |
|---|---|---|---|
| 915689 | 7/1954 | Germany .................. | 425/203 |
| GM 1985743 | 5/1968 | Germany . | |
| 24 00 271 A1 | 7/1975 | Germany . | |
| 3248659 | 7/1984 | Germany .................. | 425/203 |
| 38 40 293 A1 | 5/1990 | Germany . | |
| 37 44 193 C2 | 8/1992 | Germany . | |
| 19516082 | 11/1996 | Germany .................. | 366/75 |
| 25 39 102 A1 | 3/1997 | Germany . | |
| 60-89323 | 5/1985 | Japan ...................... | 425/203 |
| 725892 | 4/1980 | U.S.S.R. .................. | 425/203 |

*Primary Examiner*—Charles E. Cooley
*Attorney, Agent, or Firm*—Robert F. I. Conte; Lee, Mann, Smith, McWilliams, Sweeney & Ohlson

[57] ABSTRACT

A screw extruder mechanism for the processing of strongly outgassing materials comprises a main extruder for proper material processing, a material feed and discharge device and a degassing device on the main extruder for the discharge of the gas stream from the portion of evaporation. For the gas stream to branch into at least three separate streams, the degassing device comprises a first degassing port and at least two degassing elements which are opposed radially to each other in relation to the main extruder and are disposed between the portion of evaporation and the first degassing port and which are designed preferably as ancillary screw extruders opening radially into the main extruder.

24 Claims, 9 Drawing Sheets

SCREW EXTRUDER MECHANISM, IN PARTICULAR TWIN-SCREW EXTRUDER MECHANISM, FOR THE PROCESSING OF STRONGLY OUTGASSING MATERIALS

BACKGROUND OF THE INVENTION

1. Field of the Invention

The invention relates to a screw extruder mechanism, in particular a twin-screw extruder, for the processing of strongly outgassing materials.

2. Background Art

In the processing of materials of this type as it is used for instance for the degassing of volatile components from viscous fluids such as polymer melts, polymer solutions, pastes etc., high quantities of gas or steam develop, the discharge of which poses some problems. In addition to the fact that for instance a certain residual solvent content is reached, a restriction of these processes is imposed by the operationally reliable discharge of the high quantities of steam or gas that develop. This is true in particular for fluids the content of which in terms of volatile components exceeds 10% —in the extreme as much as 90% in polymer solutions,—for moist powders or in case water is fed into the extruder as an auxiliary agent for the final degassing.

The maximum possible quantity of steam to be discharged operationally reliably in a degassing process is determined by the structure of the process part of the extruder as well as by its way of operation. For instance, the number, position and geometry of the degassing ports as well as the configuration of the screws are substantial design criteria.

Screw extruder mechanisms are known from DE 24 00 271 C2 and DE 32 48 659 A1, conventionally comprising a main extruder for proper material processing, a material supply device in the form of a feed hopper, a material discharge device in the form of a discharge die, possibly a feed device for a degassing agent to be fed into a portion of evaporation of the main extruder (as in the case of the mechanism according to DE 24 00 271 C2), and a degassing device in the main extruder for the gas stream to be carried away from the portion of evaporation. Solvents, emulsions, moist bulk materials, pastes or the like can be supplied to the extruder by way of the feed device.

In the extruder mechanism according to DE 24 00 271 C2, degassing takes place by countercurrent flow degassing, steam being blown into a closed zone of the extruder, removing solvents from the material to be processed. The mixture of water vapor and solvent vapor is discharged through a vent in the form of an ancillary twin-screw extruder that opens radially into the main extruder. The screws of the ancillary twin-screw extruder which form a material barrier have such a pitch and are driven in such a direction that the solids taken along during degassing are pressed back to the material to be treated in the main extruder.

In areas that are separated from the above vent by means of pressure locks, provision is made for further degassing ports of conventional design.

The degassing activity achievable by the extruder specified above is limited, use being made regularly of only one degassing device at a time in a certain portion of evaporation of the extruder.

In the screw extruder according to DE 32 48 659 A1, provision is likewise made for two degassing devices which are mounted in varying areas of the extruder and each of which may consist of twin-screw extruders. The two degassing devices are each in connection with an independent decompression zone, a damming zone working as a separation between the two decompression zones. Consequently, degassing takes place in two isolated separate streams.

In the cases described, the flow of vapor or gas is discharged at a position upstream and/or downstream of the respective place of evaporation seen in the axial direction. For domination of the quantities of gas developing, the ports may vary in size and shape, the maximum quantities being limited nevertheless.

Furthermore, the operational reliability of a degassing port decisively depends on the gas velocity in the screw spirals and on the outlet edge of the screw channel towards the degassing port. The gas velocity again depends on the pressure (over- or underpressure) applied to the degassing port. In any case, it is a fact that the gas velocity depends on the volume rate of the gas or steam developing in the portion of evaporation so that during the processing of strongly outgassing materials and whenever major quantities of steam develop, the gas velocity will rise to critical ranges which can be controlled no longer or only with difficulty by conventional techniques.

SUMMARY OF THE INVENTION

As a solution of the problems discussed, the invention proposes an improved design of the degassing device. This branches the gas stream into at least three separate streams in the closed portion of the main extruder, on which are provided at least a first degassing port disposed upstream or downstream of the portion of evaporation and at least two degassing elements opposed to each other radially in relation to the main extruder and disposed between the portion of evaporation and the at least one first degassing port. By reason of this design, the gas velocity, in particular in the critical ranges, is reduced by analogy with the number of separate streams. Consequently, the degassing capacity and thus the throughput of the product to be degassed can be increased drastically.

The two additional degassing elements are preferably embodied as ancillary screw extruders opening radially into the main extruder. In this case, single shaft or multiple shaft machines of counter- or co-rotating design can be used as in the case of the main extruder. Preferably, the conveying direction of the ancillary screw extruders is in the direction toward the main extruder—i.e. counter to the gas stream—so that any material entering the ancillary screw extruders is pressed back.

Advantageously, the screws of the ancillary screw extruders are provided with plane faces that are disposed at a minimum distance from the screws of the main extruder. This helps ensure unimpeded transition of steam in the vicinity of the separate streams and avoid so-called "dead corners".

By the screws of the ancillary screw extruders expanding conically outwards, the flow rate can be further reduced, which additionally improves the controllability of great quantities of gas. For discharging extremely high quantities of gas or steam, combined cocurrent and countercurrent flow degassing is of advantage, for which a degassing device is provided upstream as well as downstream of the portion of evaporation, comprising a degassing port and two degassing elements radially opposed to each other preferably in the form of two ancillary screw extruders. This helps attain virtually sixfold branching of the gas stream.

For further improvement of operational reliability, damming elements can be incorporated between the position of evaporation and the degassing ports, these elements being disposed for example before the mouths of the ancillary screw extruders or in the ancillary screw extruders themselves.

The ancillary screw extruders are preferably designed as twin-screw extruders which can be flanged to the main extruder in various positions relative to the latter's conveying direction—for instance with the positional plane spanned by the axes of their screws in parallel or at right angles to the conveying direction of the main extruder.

Selective influence on the material, for instance systematic dirt removal, can be attained by varying conveying directions and/or pitches of the screws of the ancillary screw extruders radially opposed to each other.

Further features, details and advantages of the invention will become apparent from the ensuing description of various exemplary embodiments of the subject matter of the invention, taken in conjunction with the drawing.

DESCRIPTION OF THE PREFERRED EMBODIMENTS

Figure 1:
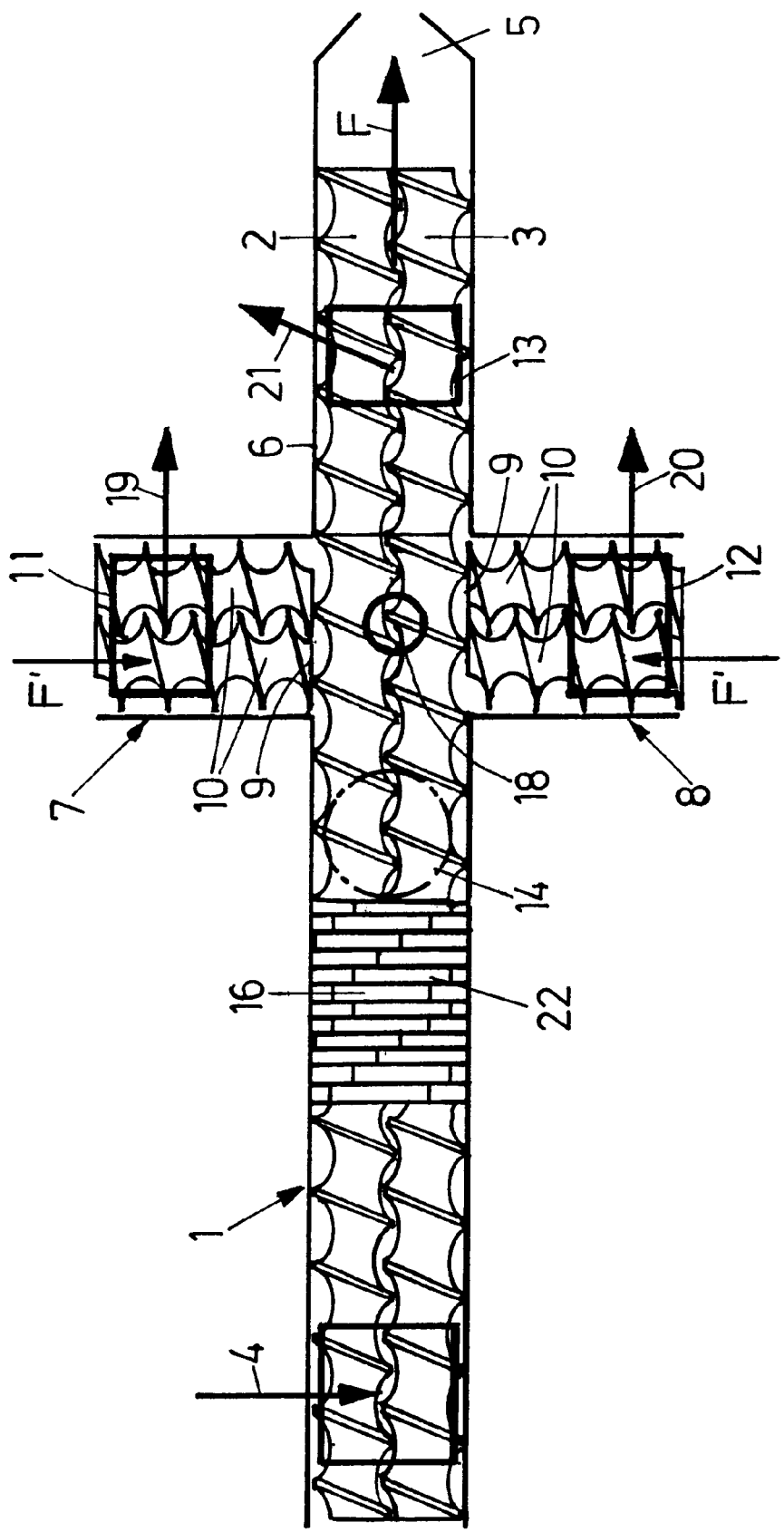
FIGS. 1 to 3 are diagrammatic illustrations of an extruder mechanism in a plan view, having varying triple branchings.

FIG. 1 illustrates the basic structure of an extruder mechanism according to the invention, which is the same in all the embodiments shown. The extruder mechanism comprises a main extruder 1, which is a twin-screw extruder with two meshing screws 2, 3 for material processing. The main extruder 1 is to be used in particular for the removal by degassing of volatile components from viscous fluids. A feed device 4, for instance a hopper with a feed screw, serves for the supply of material.

A material discharge device 5 in the form of a die is disposed at the opposite end of the main extruder 1. A heating installation is available on the housing of the main extruder in conventional manner, but not shown in detail.

In a manner radially opposed to each other, two ancillary screw extruders 7, 8 are disposed on the main extruder 1, their conveying chamber opening radially into the main extruder 1. The ancillary screw extruders 7, 8 are twin-screw extruders. The faces 9 of their screws 10 are plane and located at a minimum distance from the screws 2 and 3, respectively, of the main extruder 1. The ends, turned away from the main extruder 1, of the ancillary screw extruders 7, 8 are provided with degassing ports 11, 12 to which to admit underpressure or atmospheric pressure.

A third conventional degassing port 13 is provided on the main extruder 1 at an axial distance from the two ancillary screw extruders 7, 8.

The above general explanation of the subject matter of the invention based on FIG. 1 is valid for all the other exemplary embodiments seen in the figures with the exception of configurations explicitly mentioned for the other embodiments. In this context, identical components have the same reference numerals and require no renewed explanation.

The embodiment seen in FIG. 1 is an extruder mechanism of cocurrent flow degassing. In this case, for instance moist bulk material is led into the main extruder 1 by way of a feed device 4 in the form of an inlet and is moved via the two screws 2, 3 to a section comprising kneading disks 16. This is where the supplied material is melted. The heat of dissipation produced thereby works as a heat of evaporation for the volatile accompanying substance. Steam expansion takes place directly after the melting zone 22.

Strong outgassing and steam generation occurs in this portion of evaporation 14, the discharge of gas or steam taking place from the portion of evaporation in the conveying direction F in the example according to FIG. 1.

For controlling the high gas velocities occurring as a result of the high gas evolution rate, the two ancillary screw extruders 7, 8 form a so-called branch node 18 between themselves, in which the gas stream divides into three separate streams 19, 20, 21. The branch node 18 is disposed within the closed part of the main extruder 1, lying downstream of the portion of evaporation 14 in the case of cocurrent flow degassing. The gas of the two separate streams 19, 20 is discharged via the radially arranged ancillary screw extruders 7, 8. Since the conveying direction F' of the screws 10 is opposed to the separate streams 19 and 20, any melt entering the ancillary screw extruders 7, 8 is returned into the main extruder 1.

The third separate stream 21 leads to the degassing port 13 which is again located downstream of the portion of evaporation 14 and the branch node 18.

Specific distribution of the volume rate of the separate streams 19, 20, 21 can be obtained by varying adjustment of the suction pressure at the degassing ports 11, 12, and 13. The suction pressure to be applied depends on the steam pressure in the volatile substance, customarily ranging from 200 mbar to approximately 5 bar in case major quantities of solvents are degassed. Of course, atmospheric pressure is to be provided preferably.

Figure 2:
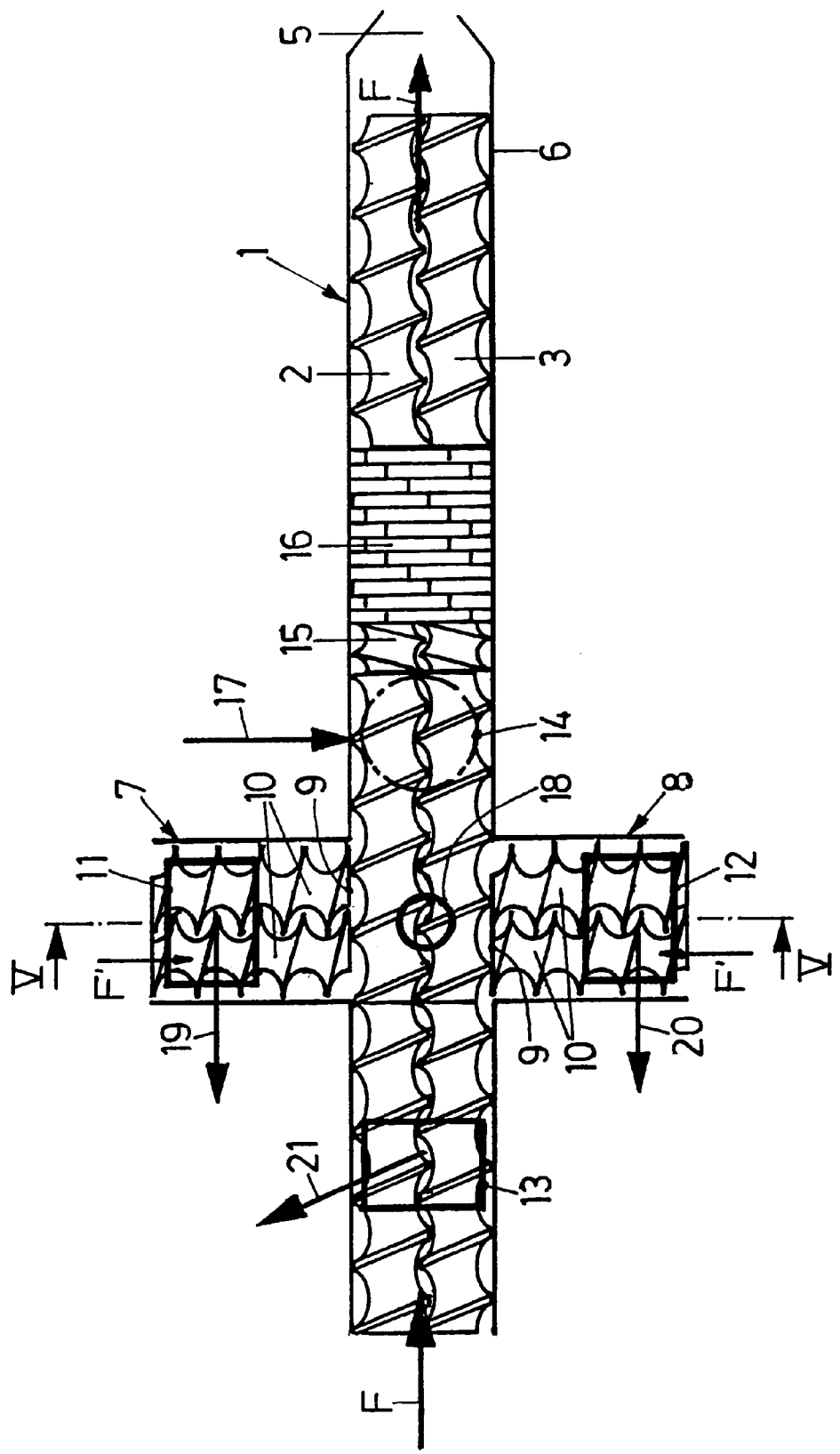

The overture seen in FIG. 2 differs from FIG. 1 in that an arrangement for countercurrent flow or backward degassing is illustrated. In this case the portion of evaporation 14 is disposed downstream of the ancillary screw extruders 7, 8 in the conveying direction F of the main extruder 1. In the upstream area of the degassing port 21 of the main extruder 1, case (A): melt can be supplied from an upstream process section, or case (B): the screws are not filled, i.e. the process section of the main extruder 1 starts by backward degassing.

A typical example of case (A) is the production of polymer blends, a polymer component I being supplied as a melt to the degassing section 21 and a polymer component II being fed as moist bulk material, as an emulsion or as a polymer solution (overheated or not overheated) via a feed device 17 into the main extruder. The volatile accompanying substance evaporates in the portion of evaporation 14 because of the supply of energy from the polymer component I. The short screw section 15 that runs in the opposite direction constitutes a melt seal in the conveying direction. The steam flows in a countercurrent flow through the screw portion partially filled with the polymer melt I and to the branch node 18 where it is split up among the degassing ports 19, 20 and 21. The polymer components I and II are homogenized in the kneading portion 16.

A typical example of case (B) is the supply of a pressurized, overheated polymer solution, by way of an appropriate valve 17 as a feed device, to the portion of evaporation 14 of the main extruder. The solvent constituent evaporates spontaneously upon expansion. The polymer constituent forms a melt seal in the damming portion 15 so that the solvent steam is forced to move via the upstream screw spirals in the direction towards the degassing ports 19, 20, 21. In the kneading portion 16, heat is again supplied by dissipation to the cooled solution and any residual solvent is removed, if necessary, in further degassing zones. The solvent constituent of a polymer solution can range from 10% to 90%. Backward degassing in three separate streams can concentrate for instance a solution of a content of 70% of a solvent to a content ranging from 5 to 10% of a solvent in the polymer.

Figure 3:
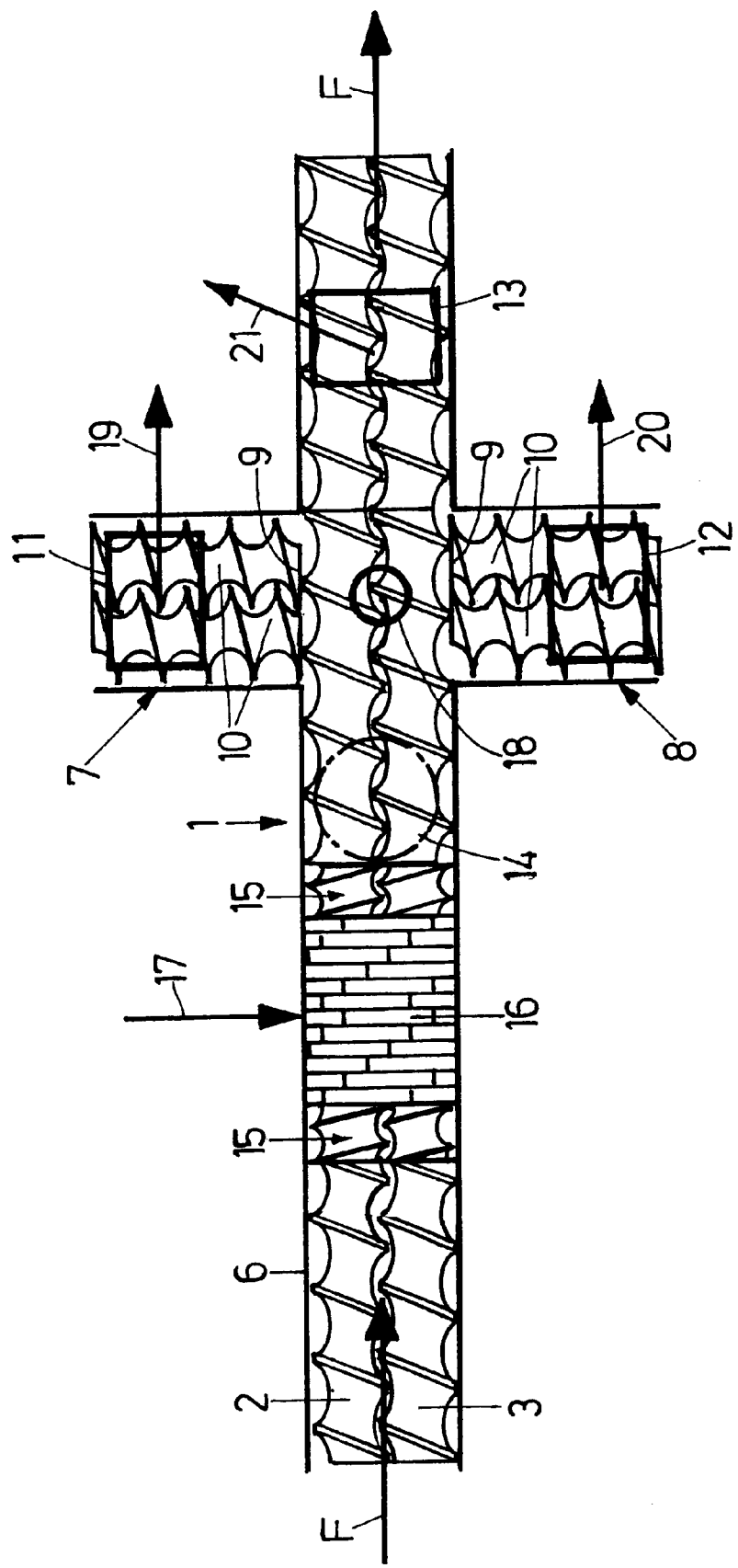

In the example of FIG. 3, same as in FIG. 1, cocurrent flow degassing takes place by ancillary screw extruders 7, 8 disposed downstream of the portion of evaporation 14 and a third degassing port 13. However, in this case, use is made of an entrainer in the form of water which is supplied through a corresponding feed device 17 to the main extruder 1. At the place of supply, kneading disks 16 are again provided for strong actuation of the material to be treated.

Figure 4:
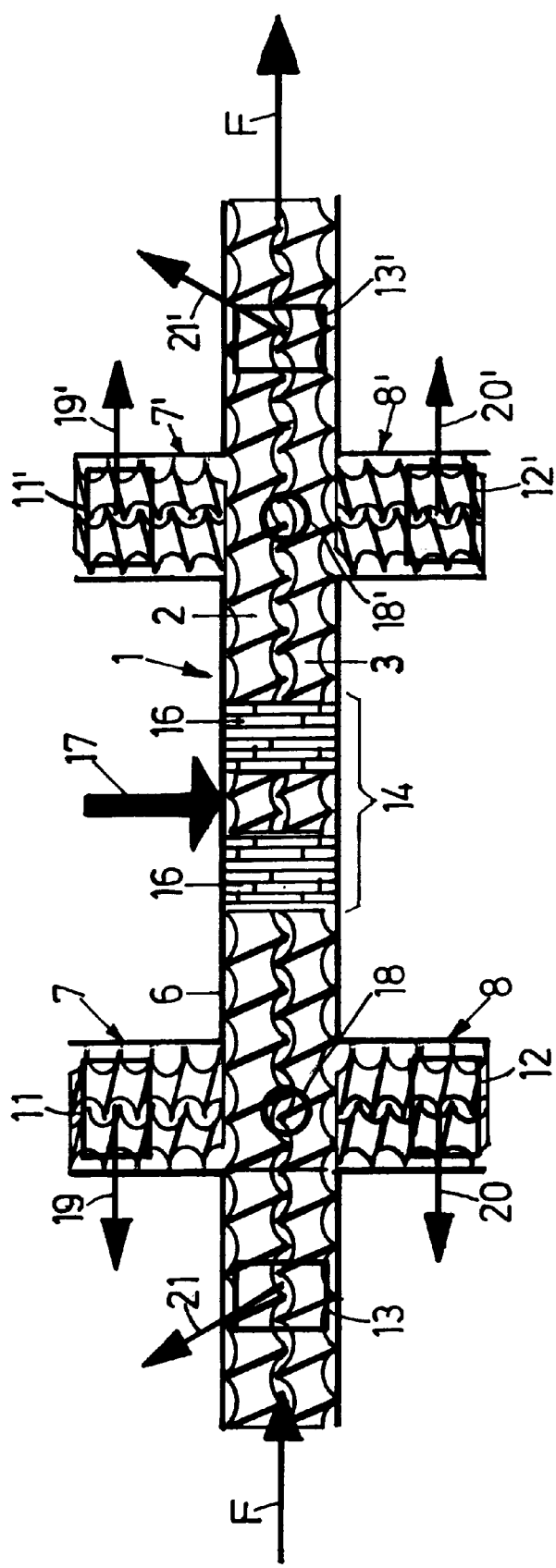
FIG. 4 is a diagrammatic illustration of an extruder mechanism in a plan view, having two triple branchings.

FIG. 4 illustrates a main extruder 1 which works by combined cocurrent and countercurrent flow degassing. Again a portion of evaporation 14 is formed substantially centrally in the main extruder 1 by two sections that comprise kneading disks 16. Ancillary screw extruders 7, 8, 7', 8' are attached to the main extruder 1 upstream as well as downstream in the way described. The further degassing port 13, 13' is located still further upstream and downstream of the portion of evaporation 14. Consequently, upstream as well as downstream of the portion of evaporation 14, there are two triple branchings of the developing gas stream into the separate streams 19, 20, 21 and 19', 20', 21', this meaning controllability of particularly high volume rates of the gas stream.

Figure 5:
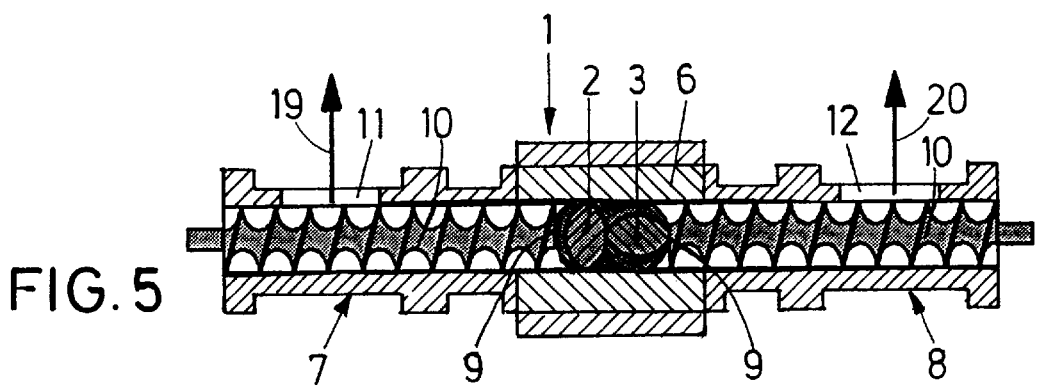
FIGS. 5 to 7 are diagrammatic sections through an extruder mechanism with ancillary screw extruders in the cutting plane V—V of FIG. 2, showing varying arrangements of the degassing ports.
Figure 6:
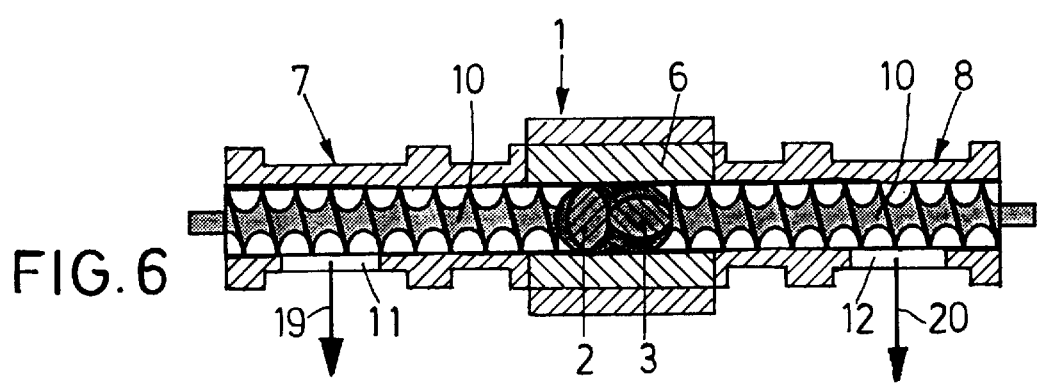
Figure 7:
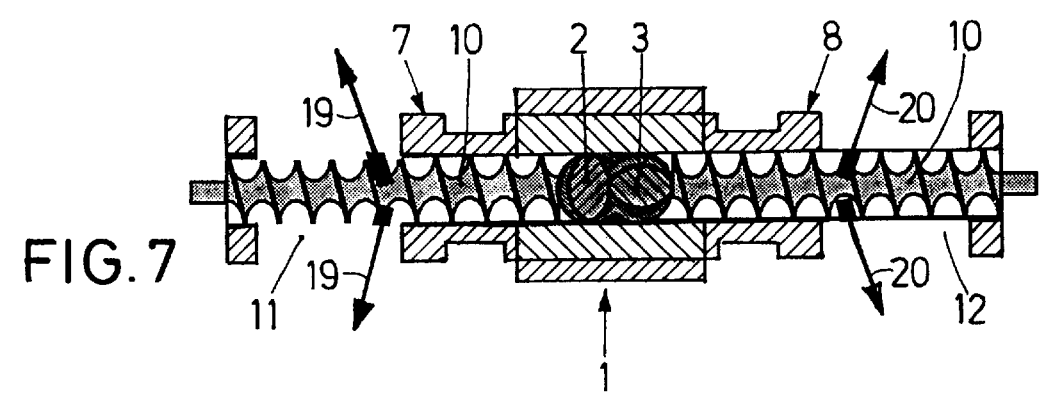

FIGS. 5 to 7 illustrate varying alternatives of the degassing ports 11, 12 on the ancillary screw extruders 7, 8. These degassing ports 11, 12 may be disposed either upwards (FIG. 5) or downwards (FIG. 6). Ports 11, 12 discharging all-over are conceivable as well (FIG. 7).

Figure 8:
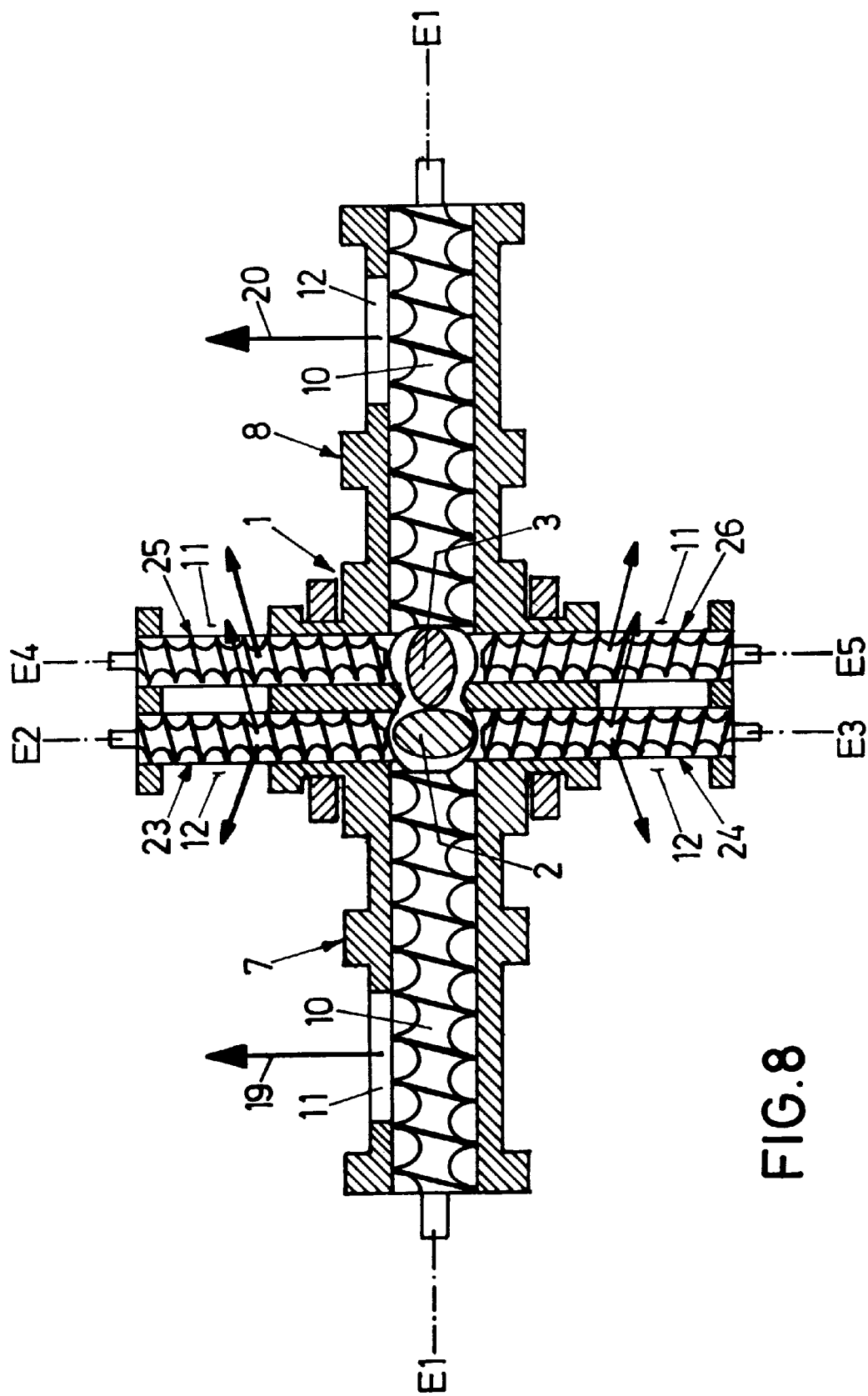
FIGS. 8 and 9 are analogous sectional views showing varying branching possibilities.
Figure 9:
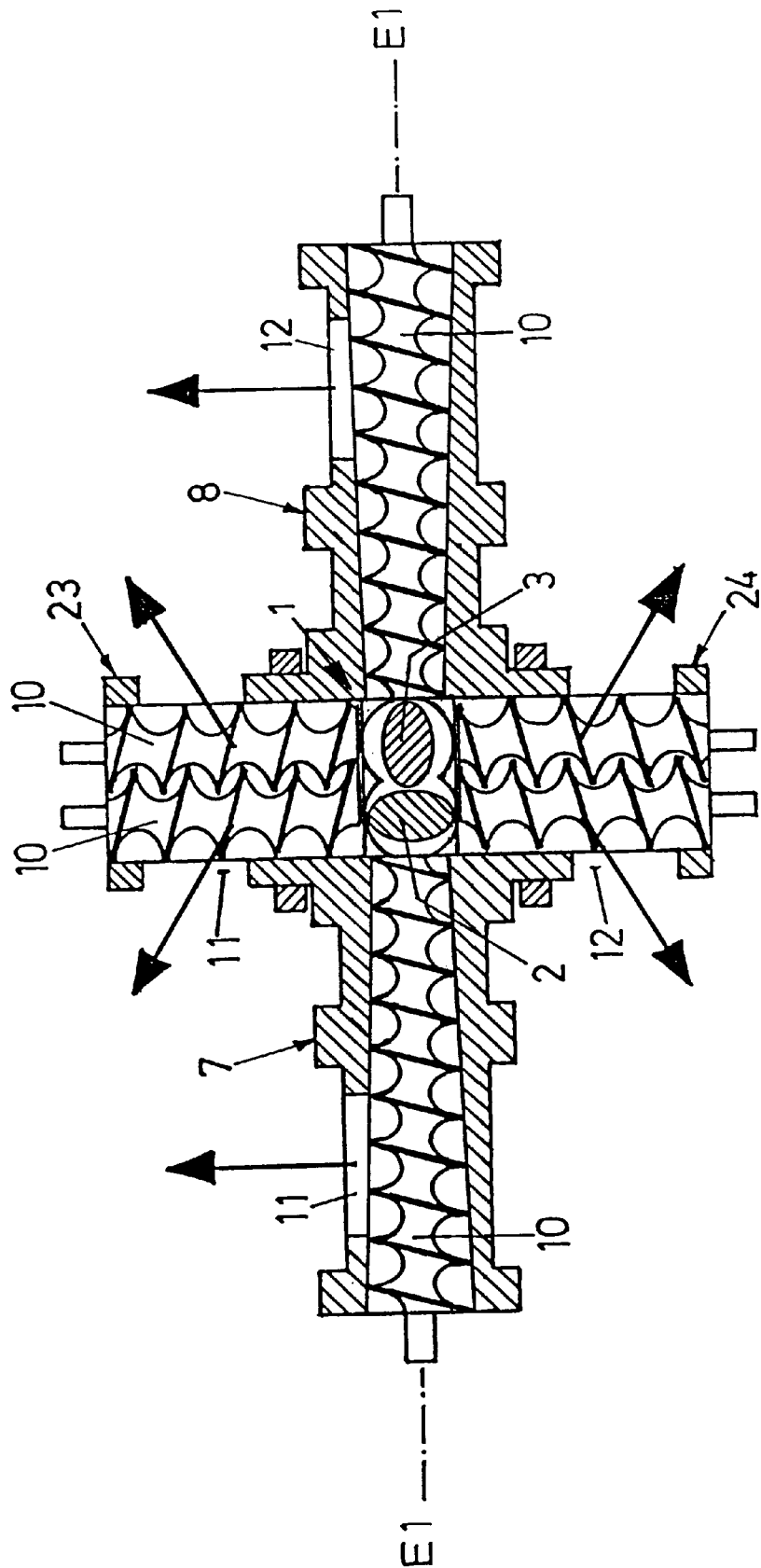

A special configuration of ancillary screw extruders is seen in FIGS. 8 and 9, respectively.

In the embodiment according to FIG. 8, six ancillary screw extruders 7, 8 (each embodied as a twin-screw extruder) are disposed opposite to each other in the radial direction relative to the main extruder 1. The two ancillary screw extruders 7, 8 are horizontal, the positional plane E1 spanned by the two axes of their screws being parallel to the conveying direction F (see FIG. 1) of the main extruder 1 and coinciding with the positional plane spanned by the two longitudinal axes of the screws 2, 3.

Another four ancillary screw extruders 23, 24, 25, 26 are disposed radially upwards and downwards, respectively, for quantities of gas to be discharged from the main extruder 1. The positional planes E2, E3, E4, E5 spanned by the respective axes of the two screws of these ancillary screw extruders 23 to 26 are again parallel to the conveying direction F (see FIG. 1); however, they are perpendicular to the positional plane spanned by the two axes of the screws 2, 3. Rather, the axes of the screws 2, 3 themselves lie in the positional planes E2 to E5.

In the embodiment of FIG. 9, four ancillary screw extruders 7, 8, 23, 24 are disposed radially opposing each other on the main extruder 1 for the purpose of additional venting.

The positional plane E1 of the two horizontal ancillary screw extruders 7, 8 corresponds to that of the embodiment according to FIG. 8; consequently, the positional plane E1 is horizontal and coincides with the positional plane spanned by the two axes of the screws 2,3.

The positional planes spanned by the longitudinal axes of the screws 10 of the ancillary screw extruders 23, 24 are vertical and disposed at right angles to the conveying direction F (see FIG. 1).

Figure 10:
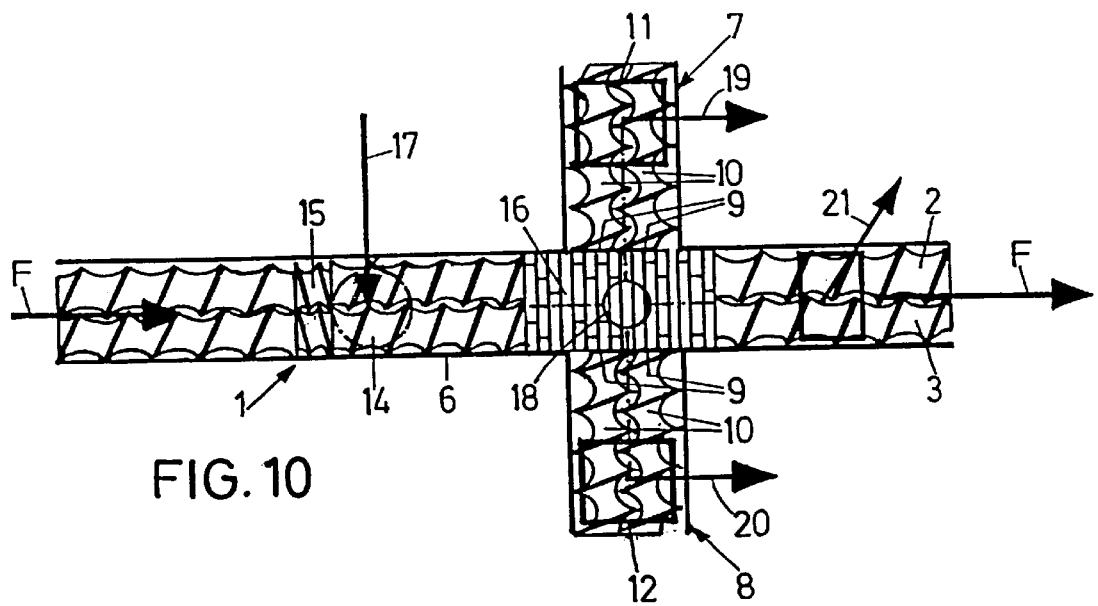
FIGS. 10 to 12 are diagrammatic illustrations of extruder mechanisms in a plan view, comprising various additional arrangements.

In the embodiment seen in FIG. 10, which fundamentally means cocurrent flow degassing by way of three separate streams 19, 20, 21, kneading disks 16 are used in the vicinity of the branch node 18 in the main extruder 1. These kneading disks 16 serve to collect for example foam particles plucked out of the melt during steam expansion.

Figure 11:
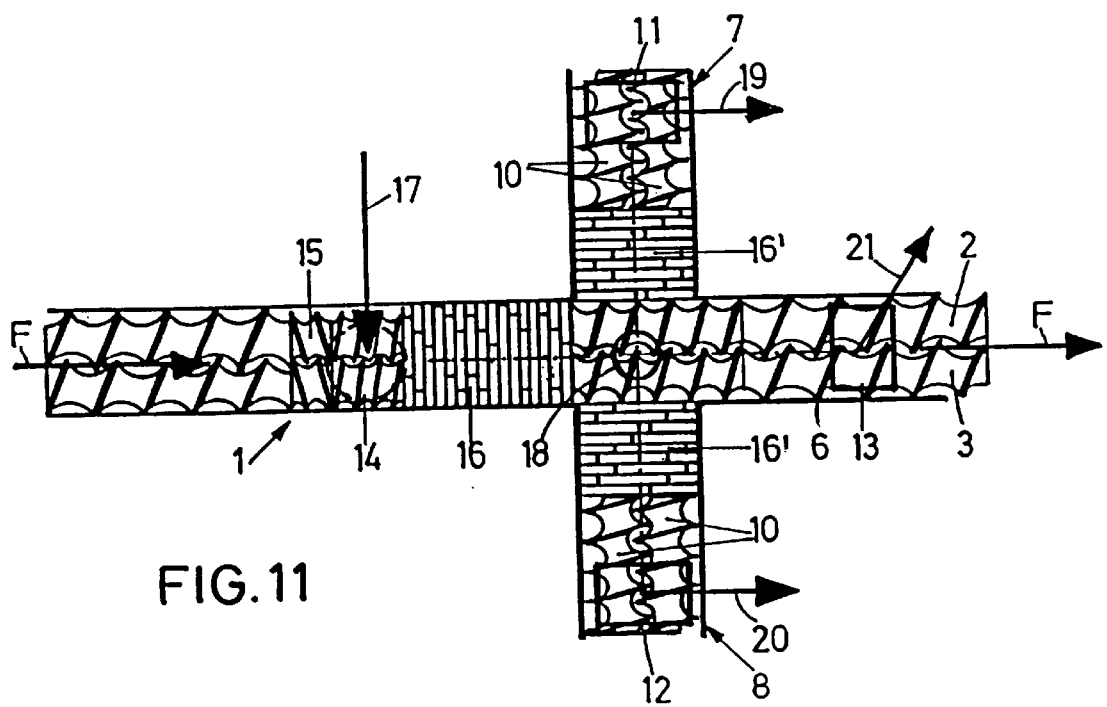

In another embodiment of an extruder according to the invention seen in FIG. 11, which again works based on cocurrent flow degassing branched into three separate streams 19, 20, 21, damming elements in the form of kneading disks 16 are disposed between the portion of evaporation 14 and the branch node 18 in the main extruder 1. Further kneading disks 16' are provided in the vicinity of the mouths of the two ancillary screw extruders 7, 8.

Figure 12:
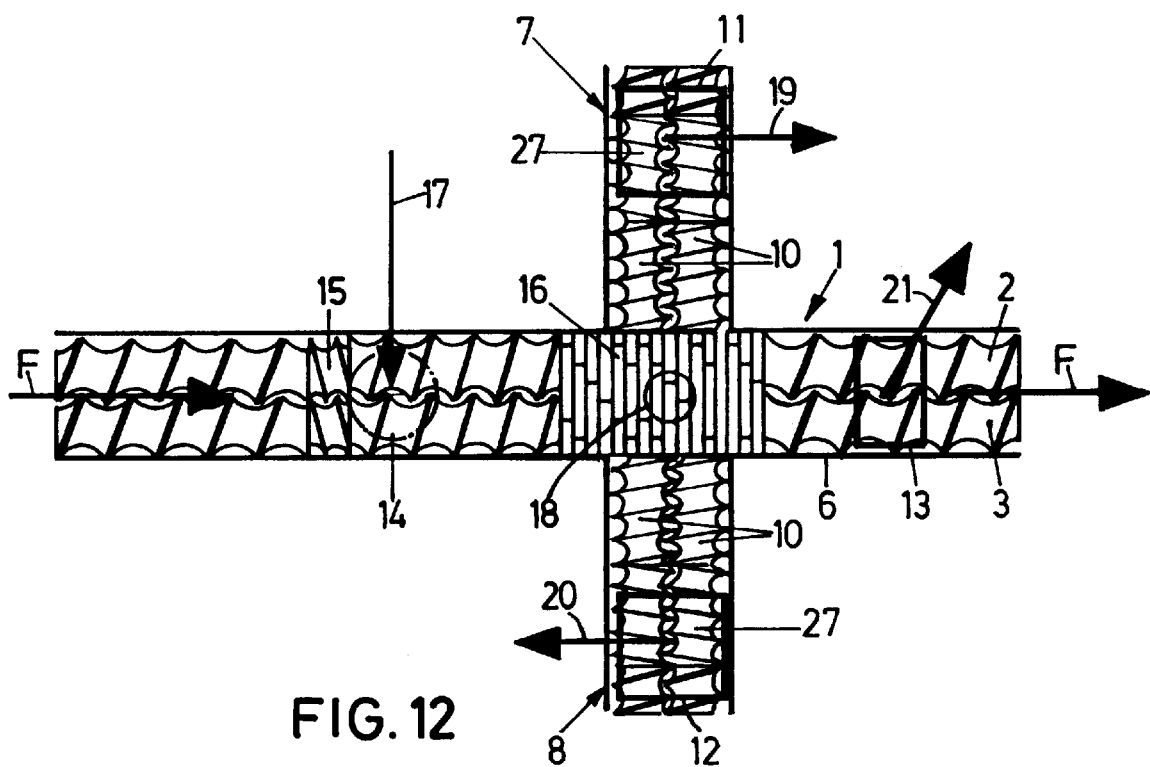

As roughly outlined in FIG. 12, the screws 10 of the ancillary screw extruders are provided with portions 27 of reversed pitch, this ensuring for instance the removal of dirt. As for the rest, the embodiment according to FIG. 12 corresponds to that according to FIG. 10.

What is claimed is:

1. A screw extruder mechanism for processing strongly outgassing materials, comprising:

a main extruder (1) with screws (2, 3) for proper material processing, with a conveying direction (F) and with a portion of evaporation, a material feed device (4) at the main extruder (1) for a supply of material to be processed, a material discharge device (5) at an end of the main extruder, and a degassing device on the main extruder (1) for a discharge of a gas stream from the portion of evaporation (14), and wherein for the gas stream to branch into at least three separate streams (19, 20, 21) in a closed portion of the main extruder (1), the degassing device comprises at least a first degassing port (13, 13') disposed upstream or downstream of the portion of evaporation (14) and at least two degassing elements (7, 8; 7',8') opposed to each other radially in relation to the main extruder (1) and extending from opposite sides of the main extruder, said degassing elements being disposed between the portion of evaporation (14) and the at least one first degassing port (13, 13').

2. A screw extruder mechanism according to claim 1 wherein the at least two degassing elements are ancillary screw extruders (7, 8; 23, 24, 25, 26) which open radially into the main extruder (1) via mouths.

3. A screw extruder mechanism according to claim 2, wherein a conveying direction of the ancillary screw extruders (7, 8; 23, 24, 25, 26) points in a direction towards the main extruder.

4. A screw extruder mechanism according to claim 2, comprising damming elements (16) disposed in the main extruder (1) before the mouths of the ancillary screw extruders (7, 8).

5. A screw extruder mechanism according to claim 2, comprising damming elements (16) disposed in the ancillary screw extruders (7, 8).

6. A screw extruder mechanism according to claim 2, wherein the ancillary screw extruders (7,8; 23,24,25,26) comprise degassing ports (11,12), which are directed downwards.

7. A screw extruder mechanism according to claim 2, wherein the ancillary screw extruders (7, 8; 23, 24, 25, 26,) comprise degassing ports (11 12), which are directed upwards.

8. A screw extruder mechanism according to claim 2, wherein the ancillary screw extruders (7, 8; 23, 24, 25, 26) comprise degassing ports (11, 12), which discharge all-over externally.

9. A screw extruder mechanism according to claim 2, wherein the ancillary screw extruders (7, 8; 23, 24, 25, 26) are twin-screw extruders which are mounted on the main extruder (1) in such a way that a positional plane (E1) spanned by axes of the screws of the ancillary screw extruders (7, 8; 23, 24, 25, 26) is parallel to the conveying direction (F) of the main extruder (1).

10. A screw extruder mechanism according to claim 2, wherein the ancillary screw extruders (23, 24) are twin-screw extruders which are mounted on the main extruder (1) in such a way that a positional plane (E2, E3) spanned by axes of the screws of the ancillary screw extruders (23, 24) is at right angles to the conveying direction (F) of the main extruder (1).

11. A screw extruder mechanism according to claim 2, wherein said radially opposed ancillary screw extruders (7, 8) have varying conveying directions and pitches.

12. A screw extruder mechanism according to claim 1, wherein for combined concurrent and countercurrent flow degassing, one of said degassing devices is disposed upstream and one of said degassing devices is disposed downstream of the portion of evaporation (14).

13. A screw extruder mechanism for processing strongly outgassing materials, comprising:
a main extruder (1) with screws (2, 3) for proper material processing,
with a conveying direction (F) and with a portion of evaporation,
a material feed device (4) at the main extruder (1) for a supply of material to be processed,
a material discharge device (5) at an end of the main extruder, and
a degassing device on the main extruder (1) for a discharge of a gas stream from the portion of evaporation (14), and
wherein for the gas stream to branch into at least three separate streams (19,20,21) in a closed portion of the main extruder (1), the degassing device comprises at least a first degassing port (13, 13') disposed upstream or downstream of the portion of evaporation (14) and at least two degassing elements (7,8,7', 8') opposed to each other radially in relation to the main extruder (1) and disposed between the portion of evaporation (14) and the at least one first degassing port (13, 13'), and
wherein the at least two degassing elements are ancillary screw extruders (7, 8; 23, 24, 25, 26) which open radially into the main extruder (1) via mouths, and
wherein the screws (10) of the ancillary screw extruders (7, 8; 23, 24, 25, 26) are provided with plane faces (9) which are disposed at a minimum distance to the screws (2,3) of the main extruder (1).

14. A screw extruder mechanism according to claim 13, wherein for combined concurrent and countercurrent flow degassing, one of said degassing elements is disposed upstream, and one of said degassing elements is disposed downstream of the portion of evaporation (14).

15. A screw extruder mechanism according to claim 13, comprising damming elements(16) disposed in the main extruder (1) before the mouths of the ancillary screw extruders(7,8).

16. A screw extruder mechanism according to claim 13, comprising damming elements(16) disposed in the ancillary screw extruders (7, 8).

17. A screw extruder mechanism according to claim 13, wherein the ancillary screw extruders (7, 8; 23, 24, 25, 26) are twin-screw extruders which are mounted on the main extruder (1) in such a way that a positional plane (E1) spanned by axes of the screws of the ancillary screw extruders (7, 8; 23, 24, 25, 26) is parallel to the conveying direction (F) of the main extruder (1).

18. A screw extruder mechanism according to claim 13, wherein the ancillary screw extruders (7, 8; 23, 24, 25, 26) are twin-screw extruders which are mounted on the main extruder (1) in such a way that a positional plane (E2, E3) spanned by axes of the screws of the ancillary screw extruders (23, 24) is at right angles to the conveying direction (F) of the main extruder (1).

19. A screw extruder mechanism for processing strongly outgassing materials, comprising:
a main extruder (1) with screws (2, 3) for proper material processing, with a conveying direction (F) and with a portion of evaporation,
a material feed device (4) at the main extruder (1) for a supply of material to be processed,
a material discharge device (5) at an end of the main extruder, and
a degassing device on the main extruder (1) for a discharge of a gas stream from the portion of evaporation (14), and
wherein for the gas stream to branch into at least three separate streams (19,20,21) in a closed portion of the main extruder (1), the degassing device comprises at least a first degassing port (13, 13') disposed upstream or downstream of the portion of evaporation (14) and at least two degassing elements (7,8, 7', 8') opposed to each other radially in relation to the main extruder (1) and disposed between the portion of evaporation (14) and the at least one first degassing port (13, 13'), and
wherein the at least two degassing elements are ancillary screw extruders (7, 8; 23, 24, 25, 26) which open radially into the main extruder (1) via mouths, and
wherein the screws (10) of the ancillary screw extruders (7, 8; 23, 24, 25, 26) expand conically outward.

20. A screw extruder mechanism according to claim 19, wherein for combined concurrent and countercurrent flow degassing, one of said degassing elements is disposed upstream, and one of said degassing elements is disposed downstream of the portion of evaporation (14).

21. A screw extruder mechanism according to claim 19, comprising damming elements(16) disposed in the main extruder (1) before the mouths of the ancillary screw extruders (7, 8).

22. A screw extruder mechanism according to claim 19, comprising damming elements(16) disposed in the ancillary screw extruders (7, 8).

23. A screw extruder mechanism according to claim 19, wherein the ancillary screw extruders (7, 8; 23, 24, 25, 26) are twin-screw extruders which are mounted on the main extruder (1) in such a way that a positional plane (E1) spanned by axes of the screws of the ancillary screw extruders (7, 8; 23, 24, 25, 26) is parallel to the conveying direction (F) of the main extruder (1).

24. A screw extruder mechanism according to claim 19, wherein the ancillary screw extruders (7, 8; 23, 24, 25, 26) are twin-screw extruders which are mounted on the main extruder (1) in such a way that a positional plane (E2, E3) spanned by axes of the screws of the ancillary screw extruders (23, 24) is at right angles to the conveying direction (F) of the main extruder (1).

* * * * *